United States Patent
Kurumida (12) 
(10) Patent No.: US 6,507,344 B2
(45) Date of Patent: Jan. 14, 2003

(54) FIGURE PROCESSING APPARATUS, FIGURE PROCESSING METHOD, AND STORING MEDIUM

(75) Inventor: Tsuneaki Kurumida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/048,847

(22) Filed: Mar. 27, 1998

(65) Prior Publication Data

US 2001/0048438 A1 Dec. 6, 2001

(30) Foreign Application Priority Data

Apr. 1, 1997 (JP) ............................................. 9-096373
Mar. 18, 1998 (JP) ........................................... 10-088233

(51) Int. Cl.$^7$ ............................................. G06T 11/20
(52) U.S. Cl. ....................... 345/468; 345/469; 345/470; 345/441; 345/442; 345/443
(58) Field of Search ................................ 345/144, 470, 345/471, 441, 442, 443, 467, 468, 469, 629, 630

(56) References Cited

U.S. PATENT DOCUMENTS 5,673,371 A * 9/1997 Koopman et al. .......... 345/467
5,757,384 A * 5/1998 Ikeda et al. ................. 345/468
5,867,172 A * 2/1999 Fujisawa et al. ............ 345/467
5,959,634 A * 9/1999 Yoshida ...................... 345/467

FOREIGN PATENT DOCUMENTS

JP          7-160242        6/1995

* cited by examiner

*Primary Examiner*—Mark Zimmerman
*Assistant Examiner*—Kimbinh T. Nguyen
(74) *Attorney, Agent, or Firm*—Fitzpatrick, Cella, Harper & Scinto (57) ABSTRACT

A thickening process of figure data (outline font data) is performed, an intersection where line segments on outlines cross is obtained, the outlines are separated at the intersection, the separated outline portions are synthesized, the rounding direction of the outlines after the outline synthesis is compared with the original rounding direction of the outlines, and the outlines in which the rounding directions are different from the original rounding direction are deleted. Thus, the outlines overlapped by the thickening process are correctly connected and the inside can be correctly painted.

16 Claims, 7 Drawing Sheets

FIGURE PROCESSING APPARATUS, FIGURE PROCESSING METHOD, AND STORING MEDIUM

BACKGROUND OF THE INVENTION

1. Field of the Invention

The invention relates to figure processing apparatus and method and a storing medium for processing outline data.

2. Related Background Art

Hitherto, a character generating apparatus disclosed in Japanese Patent Laid-Open Application No. 7-160242 has been known as a method of thickening an outline of a character. According to such a character generating apparatus, a control point constructing a shape of the outline is moved on a straight line for dividing an angle which is defined by two line segments formed by connecting two points adjacent to the control point and the control point into two equal angles, thereby enabling the outline of the character to be thickened.

The conventional character generating apparatus, however, has a problem such that in case of a character whose outlines are neighboring, there is a situation that the adjacent outlines are overlapped when the character is thickened (refer to FIG. 5B), so that a limitation occurs in a painting method of the inside after the outlines were drawn (such a method is called a scan conversion).

For example, according to the EO. Fill's method (method whereby when an outline constructing a shape of a character is scanned by a straight line which is parallel with the x axis or y axis, a point where the outline of the character and the straight line intersect is set to an on/off point of painting and the inside is painted), the overlapped portion becomes a blank space.

According to the Non-Zero Fill's method (method whereby whether a certain outline is an outside outline in which the inside should be painted or an inside outline in which the inside should be set to a blank space is discriminated by the rounding direction of the outline, thereby painting), in spite of a fact that there is no need to process the overlapped portion, the painting process is executed, so that not only it takes a long time for processing but also a capacity of a work memory which is used for processes increases.

SUMMARY OF THE INVENTION

It is, therefore, an object of the invention to provide figure processing apparatus and method and a storing medium, in which even if an overlap of outlines occurs, figure data of a high quality can be formed without causing a limitation to a painting method of the inside after the outlines were drawn.

Another method of the invention is to provide figure processing apparatus and method and a storing medium, in which when an overlap of outlines occurs, a load of the painting process of the inside after the outlines were drawn can be reduced.

To accomplish the above objects, there is provided a figure processing apparatus comprising: outline thickening means for thickening outlines of a figure to be edited; intersection calculating means for calculating an intersection when the thickened outlines cross; outline separating and synthesizing means for separating the intersecting outlines at the calculated intersection and synthesizing the separated outlines, thereby forming an outside outline and an inside outline; and deleting means for deleting an unnecessary outline in the synthesized outlines.

DETAILED DESCRIPTION OF THE PREFERRED EMBODIMENT

An embodiment of figure processing apparatus and method and a storing medium of the invention will now be described. The figure processing apparatus according to the embodiment is applied to a workstation.

Figure 1:
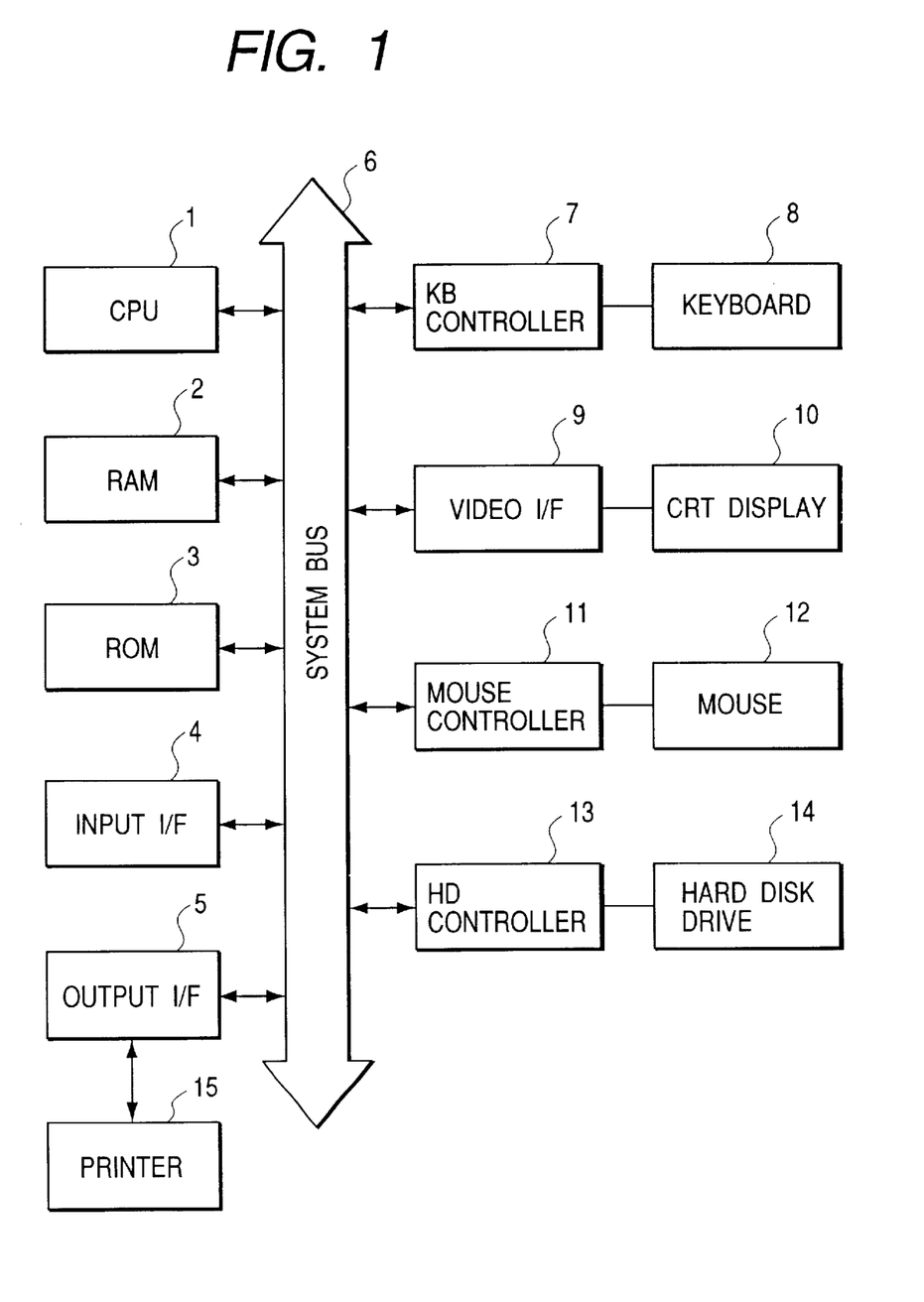
FIG. 1 is a block diagram showing a construction of a workstation.

FIG. 1 is a block diagram showing a construction of the workstation. In the diagram, reference numeral 1 denotes a CPU; 2 an RAM (random access memory); 3 an ROM (read only memory) to store a program according to a flowchart, which will be explained hereinlater, and outline font data; 4 an input I/F (interface); 5 an output I/F to which a printer 15 or the like is connected; 6 a system bus; 7 a keyboard (KBD) controller; 8 a keyboard; 9 a video I/F; 10 a CRT display to display a character pattern based on the outline font data; 11 a mouse controller; 12 a mouse; 13 a hard disk (HD) controller; and 14 a hard disk drive.

Figure 2:
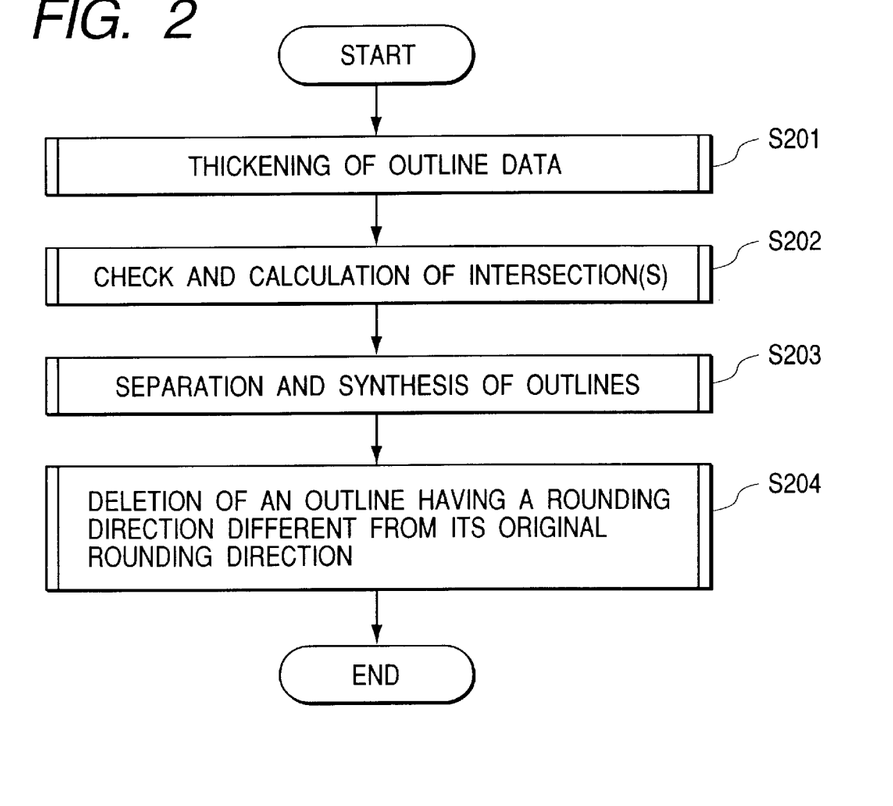
FIG. 2 is a flowchart showing an operation processing procedure of a character processing apparatus.

FIG. 2 is a flowchart showing an operation processing procedure of the character processing apparatus. The processing program has been stored in the ROM 3 and is executed by the CPU 1. First, a thickening process of an outline font (data) stored in the RAM 2 is executed (step S201). The thickening process of the outline font has been disclosed in Japanese Patent Laid-Open Application No. 7-160242 and only its summary is shown here.

Figure 3A:
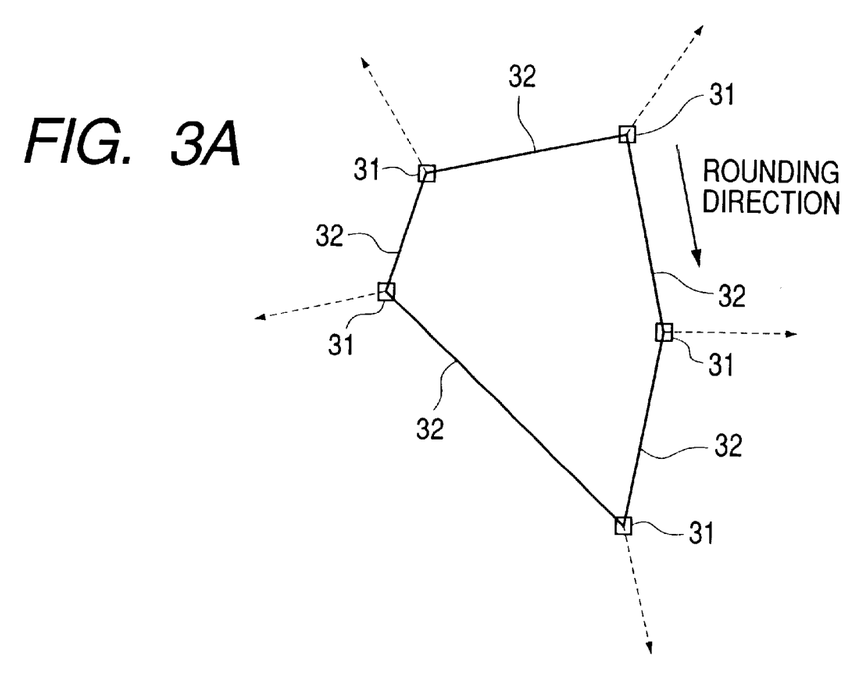
FIGS. 3A and 3B are diagrams showing a summary of a thickening process.
Figure 3B:
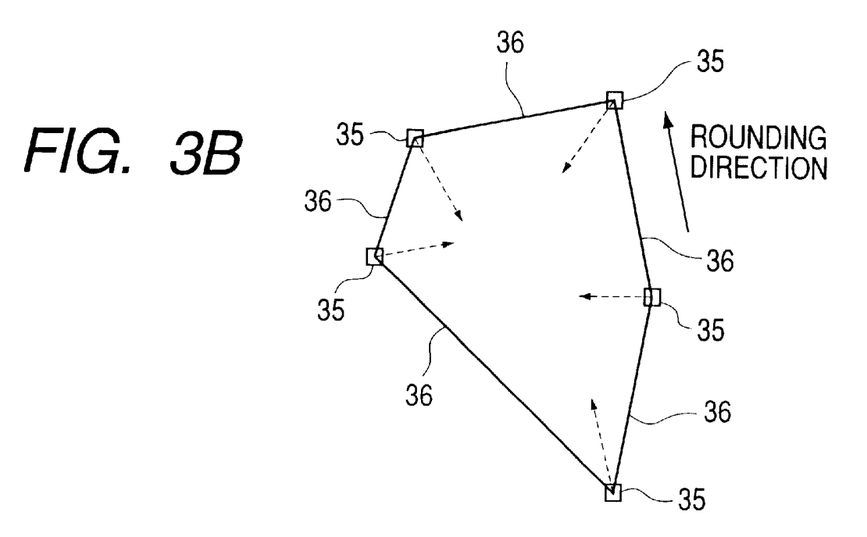
Figure 4:
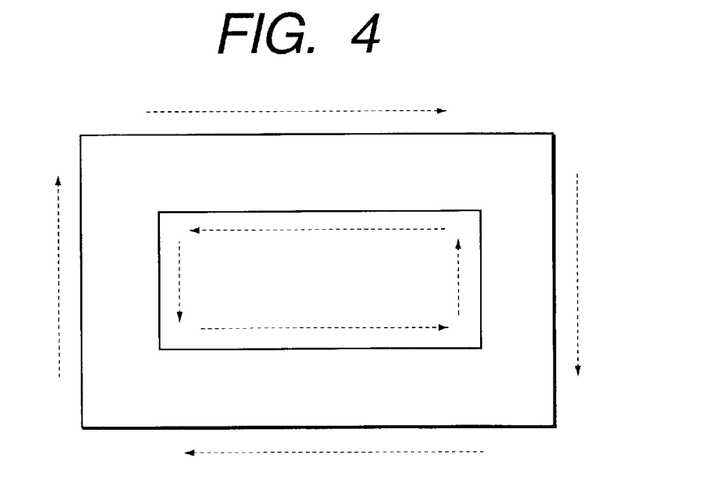
FIG. 4 is a diagram showing rounding directions on the outside and inside of outlines.

FIGS. 3A and 3B are diagrams showing an outline of the thickening process. FIG. 4 is a diagram showing the rounding directions on the outside and inside of outlines). In the diagrams, an arrow indicates the order of outline points (rounding direction of the outlines. In case of the outside outline, the rounding direction is clockwise. In case of the inside outline, the rounding direction is counterclockwise.

As shown in FIG. 3A, when the rounding direction of the outline is clockwise, since the outline is the outside outline, a control point 31 is moved toward the outside. The term "outside" denotes the direction which locates on the left side in case of considering each line segment 32 of the outline as a vector. Since each line segment 32 on each outline has a direction, the direction (direction shown by an arrow of a broken line) to move the control point 31 can be easily discriminated.

FIG. 3B shows a case when the rounding direction of the outline is counterclockwise. In this case, since the outline is the inside outline, a control point 35 is moved toward the inside. The term "inside" also denotes the direction which locates on the left side in case of considering each line segment 36 of the outline as a vector in a manner similar to the term "outside". That is, the character can be thickened by moving the control point 35 in the direction shown by an arrow of a broken line so as to move each line segment 36 of the outline to the left.

Figure 5A:
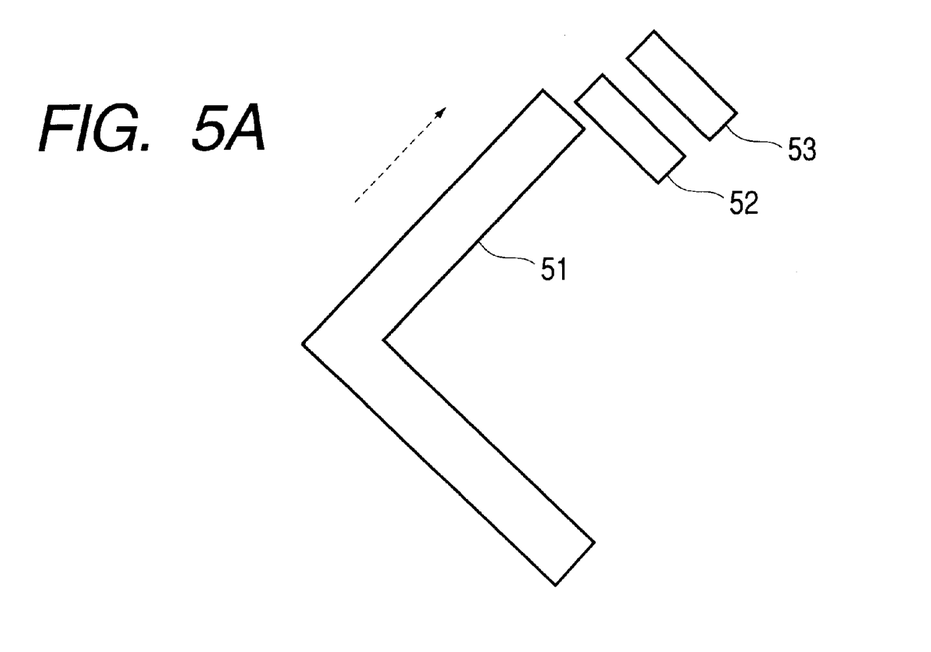
FIGS. 5A and 5B are diagrams showing a thickening process of a Japanese character pattern "ぐ" (which pronounces "gu") as an example.
Figure 5B:
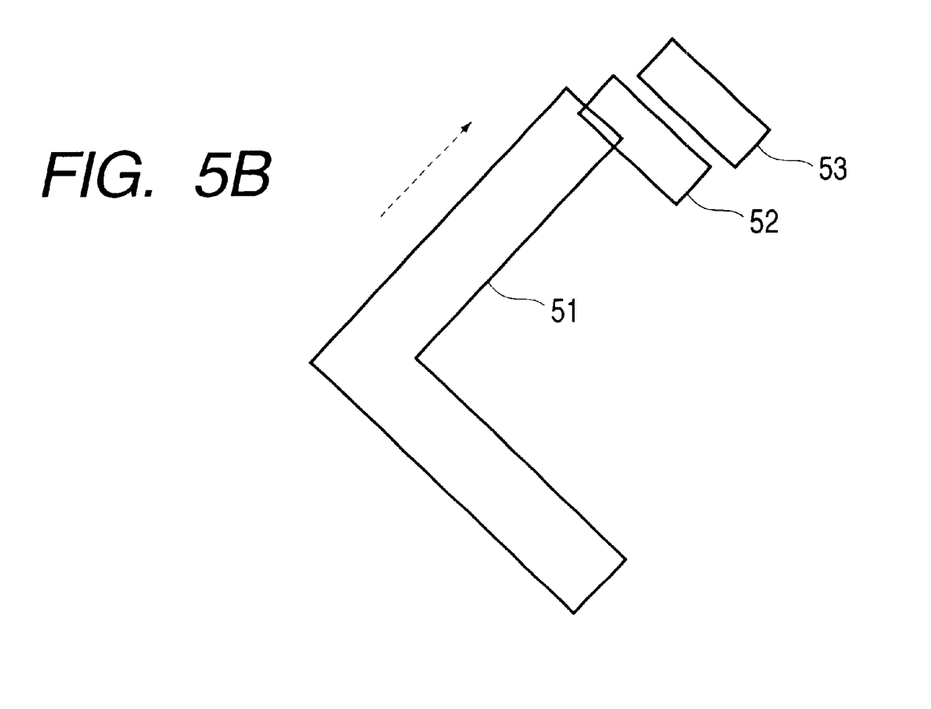

FIGS. 5A and 5B are diagrams showing a thickening process for a Japanese character pattern "ぐ" (which pronounces "gu") as an example. This pattern comprises a portion 51 of "く" and portions 52 and 53 of " ゛ " FIG. 5A shows the character of "ぐ" before the thickening process. In this case, the portion 51 of "く" and the portion 52 of " ゛ " are close to each other. FIG. 5B shows the character of "ぐ" after the thickening process in step S201 and the outlines are partially overlapped.

Subsequently, an intersection at which the line segments on the outline cross (step S202) is checked. When the intersection is checked, in case of a straight line, since it is sufficient to obtain a solution of a linear equation, the intersection can be easily obtained. In case of a curve, the intersection can be obtained by approximating the curve by a short line segment or by performing an approximating process such as a Newton's method or the like. In any method, the process to obtain the intersection can be executed by a mathematical or simple computer programming.

Figure 6A:
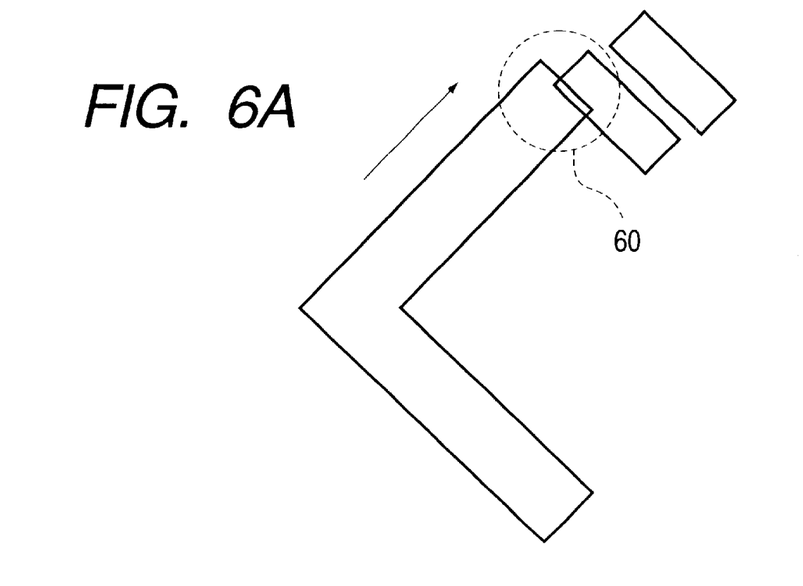
FIGS. 6A and 6B are diagrams showing processes for obtaining an intersection of outlines and performing an outline synthesis.
Figure 6B:
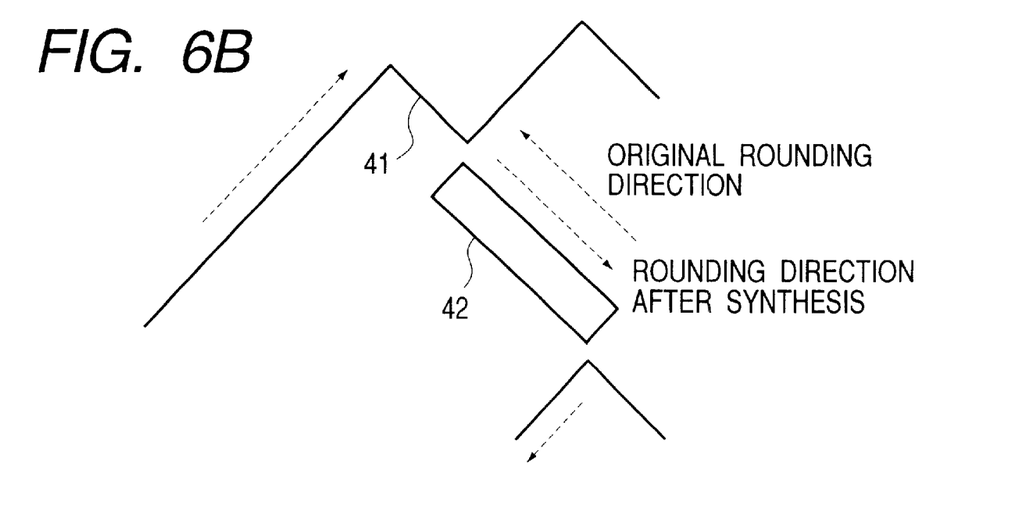

The outline is separated at the intersection and the separated outline portions are synthesized (step S203). FIGS. 6A and 6B are diagrams showing a process for obtaining the intersection of the outlines and synthesizing the outlines. FIG. 6A shows a process for newly synthesizing outlines after the outlines were separated at the intersection. Even if the outline synthesis is executed, since the synthesized portion cannot be apparently distinguished in FIG. 6A, a range shown by a circle 60 of a broken line in FIG. 6A is enlargedly shown in FIG. 6B. In FIG. 6B, although the intersection of the outlines is separately drawn for easy understanding, the outlines are actually in contact with each other.

Since the direction of each line segment before the separation and synthesis and that after the separation and synthesis are not changed, the rounding directions of the outlines are held. The rounding direction of an outside outline 41 is clockwise and coincides with the original rounding direction of the outline. On the other hand, the rounding direction of the inside outline 42 is also clockwise and the original rounding direction of the inside outline is counterclockwise, so that a difference occurs between the rounding directions.

An algorithm for discriminating whether each of the outlines 41 and 42 shows the inside outline or the outside outline will now be described.

The original rounding direction of the outline can be discriminated by obtaining a containing relation of the outlines. A procedure to discriminate whether a specific outline is an outside outline or an inside outline will now be explained.

(1) One point (hereinafter, labeled as a point A) on an outline to be examined is extracted.
(2) Whether all of the outlines which do not include the point A contain the point A or not is discriminated.
(3) If the number of outlines which contain the point A is equal to an even number, it is determined that the outline including the point A is inherently the outside outline. If it is equal to an odd number, it is decided that the outline including the point A is the inside outline.

Although there are several methods of discriminating whether the outlines contain the point A or not in the above step (2), two easy methods will now be explained.

The easiest method is a method whereby the outline to be examined is painted and whether the coordinates where the point A exists have been painted or not is checked, thereby enabling the above discrimination to be performed. In this case, such a discrimination can be made by merely checking whether the specific coordinates are black or white.

The other easy method is a method of discriminating whether line segments obtained by sequentially connecting the point A and all of the control points constructing the outline to be examined circulate once (360°) around the point A or not (0°). When they circulate once, it is determined that the point A is included on the inside of the outlines. When they do not circulate, it is decided that the point A is out of the outlines.

By the above methods, the original rounding direction of the outlines can be known.

Figure 7:
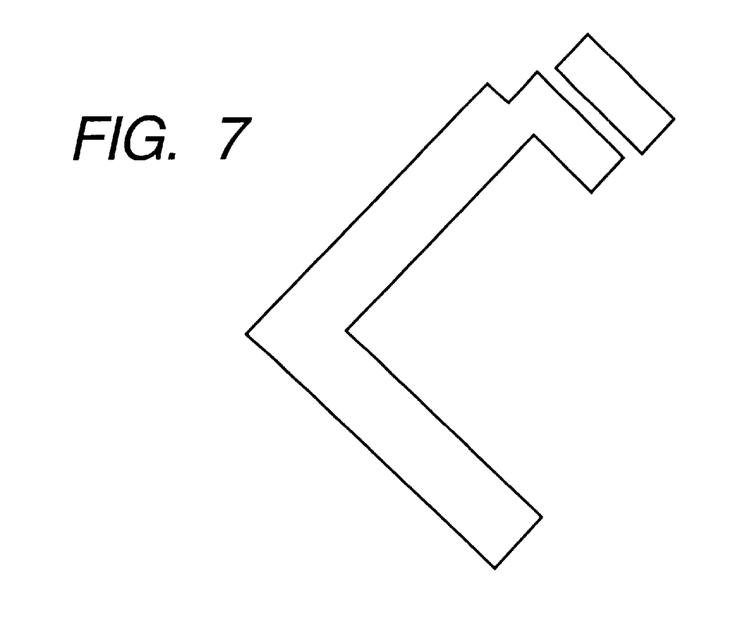
FIG. 7 is a diagram showing outlines of a character after the surplus outlines were deleted.

In step S203, the rounding direction of the outlines after the outline synthesis is compared with the original rounding direction of the outlines and the outline in which the rounding direction is different from the original rounding direction is deleted (step S204). Thus, the surplus outlines (inside outline 42 in FIG. 6B) are deleted and a character of a thick character shape can be obtained. FIG. 7 is a diagram showing an outline of the character after the surplus outlines were deleted. It will be understood that the overlapped outlines are correctly connected by the thickening process.

According to the character processing apparatus of the embodiment as mentioned above, the intersection where the outlines cross is obtained and the separation and synthesis of the outlines are executed at the intersection, and after that, the outlines whose rounding directions are different from the original rounding direction are deleted, so that the outlines which were overlapped due to the thickening process are correctly connected. Therefore, no limitation occurs in the painting method of the inside after the outlines were drawn (scan conversion), character data of a high quality is formed, and the resultant character can be displayed by the CRT 10 or can be printed by the printer.

The invention can be applied to a system comprising a plurality of equipment or can be also applied to an apparatus comprising one equipment. It will be understood that the invention can be also applied to a case where it is accomplished by supplying a program to a system or an apparatus. In this case, the program which is expressed by software to accomplish the invention is stored into a storing medium and the program is read out from the storing medium and installed to a system or an apparatus, so that the system or apparatus can obtain the effect of the invention.

Figure 8:
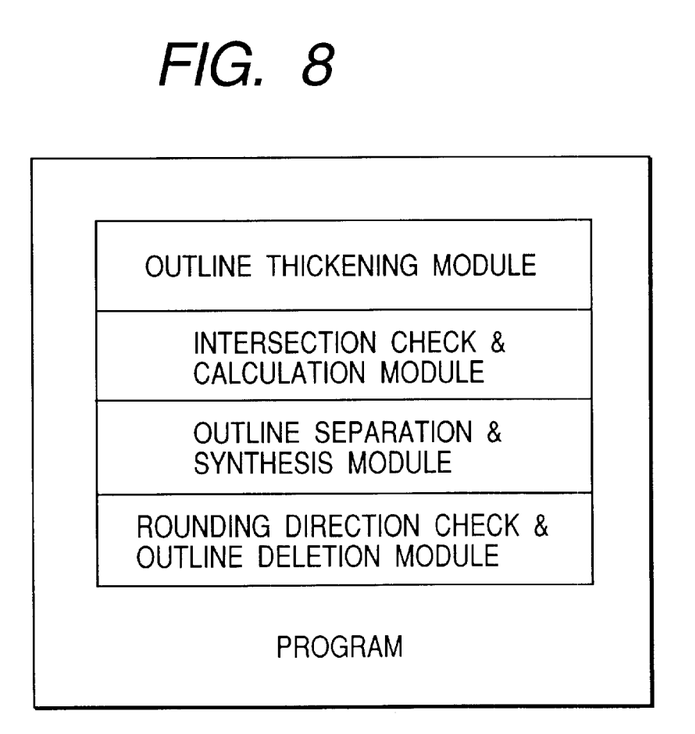
FIG. 8 is an explanatory diagram showing a memory map in a storing medium.

In the embodiment, the ROM 3 is used as a storing medium. A program including an outline thickening module, an intersection check and calculation module, an outline separation and synthesis module, and a rounding direction check and outline deletion module has been stored in the ROM 3. FIG. 8 is an explanatory diagram showing a memory map in the storing medium. The outline thickening module is a module for performing a thickening process of an outline font (data). The intersection check and calculation module is a module for obtaining an intersection at which the line segments on the outlines cross. The outline separation and synthesis module is a module for separating the intersection portion from the outlines and synthesizing the separated outline portions. The rounding direction check and outline deletion module is a module for comparing the rounding direction of the outlines after completion of the outline synthesis with the original rounding direction of the outlines and deleting the outlines in which the rounding directions are different from the original rounding direction.

As a storing medium for supplying such a program, in addition to the foregoing ROM, for example, it is possible to use any one of a floppy disk, a hard disk, an optical disk, a magnetooptic disk, a CD-ROM, a CD-R, a DVD, a magnetic tape, a non-volatile memory card, and the like.

Figure 9:
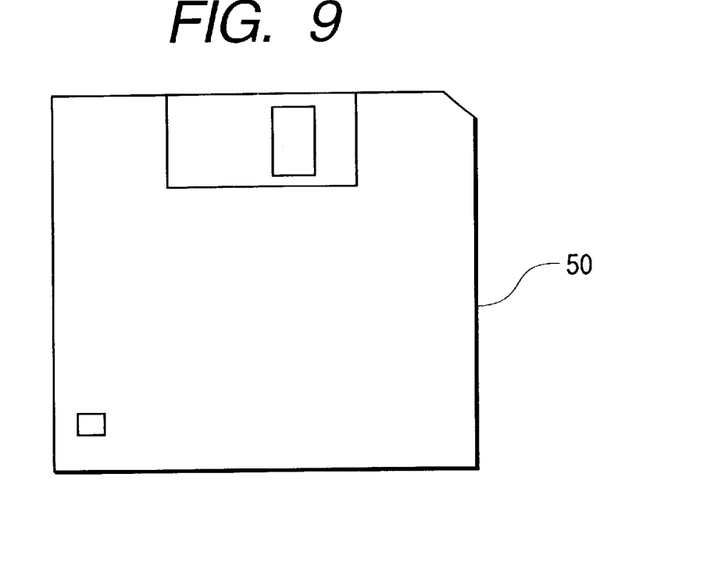
FIG. 9 is a diagram showing an external view of a floppy disk which is used as a storing medium.
Figure 10:
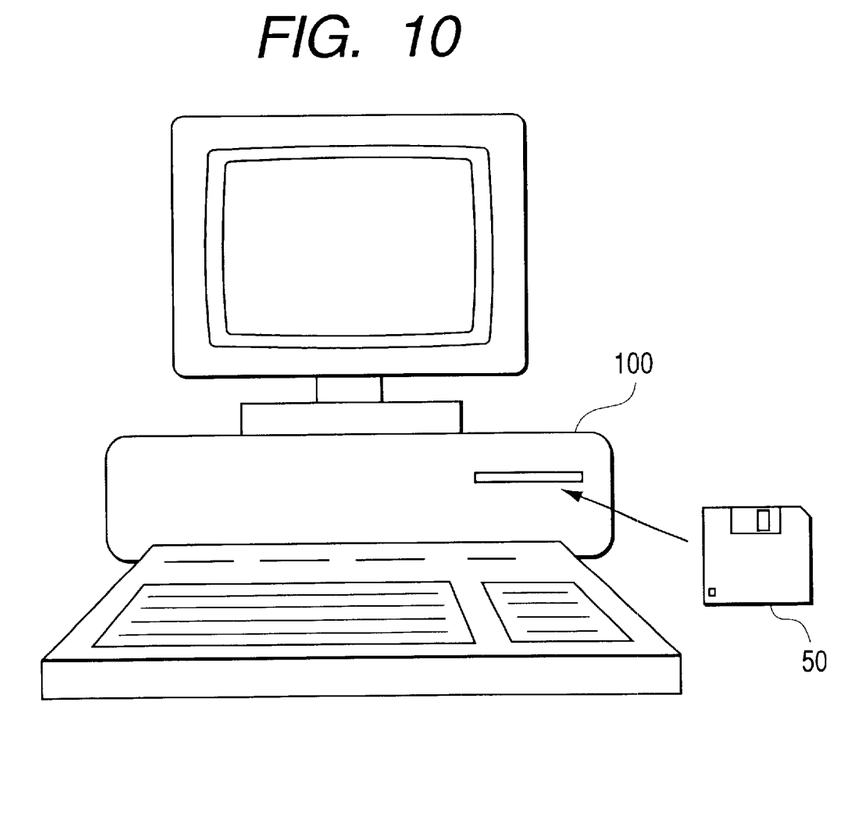
FIG. 10 is a diagram showing a computer in which programs stored in a floppy disk 50 are loaded.

FIG. 9 is a diagram showing an external view of a floppy disk which is used as a storing medium. A floppy disk 50 is a disk of a 3.5-inch type. FIG. 10 is a diagram showing a computer in which the program stored in the floppy disk 50 is loaded. One floppy disk drive is provided for a computer main body 100. By setting the floppy disk 50 into the floppy disk drive, the program is loaded into the computer main body 100.

By using a portable storing medium as mentioned above, the general workstation or personal computer can be made function as a figure processing apparatus.

According to the figure processing apparatus of the invention, when a figure is edited, the outline of the character to be edited is thickened by the outline thickening means and in the case where the thickened outline intersects, the intersection is calculated by the intersection calculating means, the intersecting outlines are separated at the calculated intersection by the outline separating and synthesizing means, the separated outlines are synthesized, the outside outline and inside outline are formed, and the unnecessary outline in the synthesized outlines is deleted by the deleting means. Therefore, figure data of a high quality can be formed without causing a limitation in the painting method of the inside after the outlines were drawn. A load of the painting process of the inside after the outlines were drawn can be reduced.

According to the figure processing apparatus, the rounding direction discriminating means for discriminating whether the rounding directions of the outside outline and inside outline which are synthesized are correct or not is provided. The deleting means deletes the outlines in which the rounding directions were determined to be incorrect, so that the outlines which were overlapped by the thickening process can be correctly connected.

According to the figure processing apparatus, since the figure data is the outline font, it can be applied to the edition of the outline font.

According to the figure processing method, since the character processing method of editing a figure comprises the steps of: thickening outlines of the character to be edited; calculating the intersection when the thickened outlines cross; separating the intersecting outlines at the calculated intersection and synthesizing the separated outlines to the outside outline and the inside outline; and deleting the unnecessary outline in the synthesized outlines. Therefore, the figure data of a high quality can be formed without causing a limitation in the painting method of the inside after the outlines were drawn. The load of the painting process of the inside after the outlines were drawn can be reduced.

According to the figure processing method, the method comprises the step of discriminating whether the rounding directions of the outside outline and the inside outline which are synthesized are correct or not. The outlines in which the rounding direction were determined to be incorrect are deleted. Thus, the outlines which were overlapped by the thickening process can be correctly connected.

According to the storing medium, the program which is executed by a computer and includes the outline thickening module for thickening the outlines of the character to be edited when the figure is edited, the intersection check and calculation module for calculating the intersection when the thickened outlines cross, the outline separation and synthesis module for separating the intersecting outlines at the calculated intersection and synthesizing the separated outlines, thereby forming the outside outline and the inside outline, and the outline deletion module for deleting the unnecessary outline in the synthesized outlines has been stored. Therefore, an information processing apparatus such as general workstation, personal computer, or the like can be made function as a figure processing apparatus and generality of the information processing apparatus can be raised.

According to the storing medium, it includes the rounding direction check module for discriminating whether the rounding directions of the outside outline and the inside outline which are synthesized are correct or not, and the program to delete the outlines in which the rounding directions were determined to be incorrect has been stored in the outline deletion module. Therefore, the information processing apparatus can be constructed as a figure processing apparatus having a higher function.

What is claimed is:

1. A figure processing apparatus for processing a figure which includes inside and outside outlines having respective predetermined directions, said apparatus comprising:

thickening means for thickening first and second outlines;

calculation means for calculating an intersection of the first and second outlines thickened by said thickening means;

generation means for generating third and fourth outlines by separating the first and second outlines thickened by said thickening means from each other based on the intersection calculated by said calculation means, and by connecting the separated first and second outlines such that the direction of one of the first and second outlines becomes identical to that of the other of the first and second outlines;

deletion means for determining, for each of the third and fourth outlines, whether the outline is an inside outline or an outside outline and whether the outline has a direction different from the predetermined direction, and for deleting either of the third or fourth outlines if the outline is determined to have a direction different from the predetermined direction; and output means for outputting the figure including those of the third and fourth outlines not deleted by said deletion means.

2. An apparatus according to claim 1, wherein the predetermined direction of the inside outline is defined in a counterclockwise direction and the predetermined direction of the outside outline is defined in a clockwise direction.

3. An apparatus according to claim 1 wherein the figure comprises a character.

4. An apparatus according to claim 1 wherein said deletion means identifies one point on a certain outline, discriminates for each outline which does not have the one point whether the outline encloses the one point, and determines that the certain outline is an inside outline if an even number of outlines enclose the one point, and is an outside outline if an odd number of outlines enclose the one point.

5. An apparatus according to claim 1, further comprising means for painting inside of the third or fourth outlines, wherein said output means outputs the figure in which the inside of the third and fourth outlines is painted by said painting means.

6. An apparatus according to claim 1, wherein said output means comprises a display device.

7. An apparatus according to claim 1, wherein said output means comprises a printer.

8. A figure processing method for processing a figure which includes inside and outside outlines having respective predetermined directions, comprising the steps of:

thickening first and second outlines;

calculating an intersection of the first and second outlines thickened in said thickening step;

generating third and fourth outlines by separating the first and second outlines thickened in said thickening step from each other based on the intersection calculated in said calculation step, and by connecting the separated first and second outlines such that the direction of one of the first and second outlines becomes identical to that of the other of the first and second outlines;

determining, for each of the third and fourth outlines, whether the outline is an inside outline or an outside outline and whether the outline has a direction different from the predetermined direction;

deleting either of the third or fourth outlines if the outline is determined to have direction different from the predetermined direction; and outputting the figure including those of the third and fourth outlines not deleted in said deleting step.

9. A method according to claim 8, wherein the predetermined direction of the inside outline is defined in a counterclockwise direction and the predetermined direction of the outside outline is defined in a clockwise direction.

10. A method according to claim 8, wherein the figure comprises a character.

11. A method according to claim 8, wherein said deletion step identifies one point on a certain outline, discriminates for each outline which does not have the one point whether the outline encloses the one point, and determines that the certain outline is an inside outline if an even number of outlines enclose the one point, and is an outside outline if an odd number of outlines enclose the one point.

12. A method according to claim 8, further comprising a step for painting inside of the third and fourth outlines, wherein the figure in which the inside of the third and fourth outlines is painted in said painting step is output in said outputting step.

13. A method according to claim 8, wherein the figure is output in said output step using a display device.

14. A method according to claim 8, wherein the figure is output in said output step using a printer.

15. A computer-readable medium storing computer-executable process steps for figure processing which includes inside and outside outlines having respective predetermined directions, the process steps comprising:

a thickening step for thickening first and second outlines;

a calculation step for calculating an intersection of the first and second outlines thickened in said thickening step;

a generation step for generating third and fourth outlines by separating the first and second outlines thickened in said thickening step from each other based on the intersection calculated in said calculation step, and by connecting the separated first and second outlines such that the direction of one of the first and second outlines becomes identical to that of the other of the first and second outlines; and a deletion step for determining, for each of the third and fourth outlines, whether the outline is an inside outline or an outside outline and whether the outline has a direction different from the predetermined direction, and for deleting either of the third and fourth outlines if the outline is determined to have a direction different from the predetermined direction; and outputting the figure including those of the third and fourth outlines not deleted in said deletion step.

16. Computer-executable process steps stored on a computer readable medium, said computer-executable process steps for figure processing, said computer-executable process steps comprising process steps to perform a method according to any one of claims 8, 9, 10 and 11 to 14.

* * * * *